(12) United States Patent
Vohra et al.

(10) Patent No.: US 9,599,471 B2
(45) Date of Patent: Mar. 21, 2017

(54) DUAL USE OF A RING STRUCTURE AS GYROSCOPE AND ACCELEROMETER

(71) Applicant: Analog Devices, Inc., Norwood, MA (US)

(72) Inventors: Gaurav Vohra, Norwood, MA (US); Jeffrey A. Gregory, Malden, MA (US)

(73) Assignee: Analog Devices, Inc., Norwood, MA (US)

( * ) Notice: Subject to any disclaimer, the term of this patent is extended or adjusted under 35 U.S.C. 154(b) by 96 days.

(21) Appl. No.: 14/531,123

(22) Filed: Nov. 3, 2014

(65) Prior Publication Data

US 2016/0153779 A1  Jun. 2, 2016

Related U.S. Application Data

(63) Continuation-in-part of application No. 14/080,370, filed on Nov. 14, 2013.

(51) Int. Cl.
  *G01C 19/56* (2012.01)
  *G01C 19/5698* (2012.01)
  (Continued)

(52) U.S. Cl.
  CPC ..... *G01C 19/5698* (2013.01); *G01C 19/5684* (2013.01); *G01P 15/097* (2013.01); *G01P 15/125* (2013.01); *G01P 15/18* (2013.01)

(58) Field of Classification Search
  CPC ............ G01C 19/5698; G01C 19/5677; G01C 19/5719; G01C 19/5684; G01C 19/56; G01C 19/5691; G01P 15/125; G01P 15/18
  (Continued)

(56) References Cited

U.S. PATENT DOCUMENTS

| 3,656,354 A | * | 4/1972 | Lynch ................ G01C 19/5691 |
| | | | 73/504.13 |
| 4,655,081 A | | 4/1987 | Burdess ......................... 73/505 |

(Continued)

FOREIGN PATENT DOCUMENTS

| EP | 0860685 | 8/1998 | ............. G01C 19/56 |
| EP | 1788385 | 5/2007 | ............. G01N 29/02 |

(Continued)

OTHER PUBLICATIONS

Park et al., "Oscillation Control Algorithms for Resonant Sensors with Applications to Vibratory Gyroscopes," *Sensors*, vol. 9, pp. 5952-5967 (2009).

(Continued)

*Primary Examiner* — Helen Kwok
(74) *Attorney, Agent, or Firm* — Sunstein Kann Murphy & Timbers LLP

(57) ABSTRACT

Methods and apparatus for sensing linear acceleration with a MEMS resonator mass, alone, or concurrently with sensing rate of rotation. A resonator mass, which may be a disk or a ring structure, is driven at a resonance frequency of one of the vibration modes of the resonator mass. The amplitude of vibration of that mode is sensed by a set of at least two drive-sense electrodes disposed at opposing positions across the resonator mass. A linear acceleration is derived based at least on a difference between signals of the opposing electrodes. Linear acceleration may be sensed in multiple orthogonal dimensions using multiple pairs of opposing electrodes. Rotation rate may be derived concurrently by sensing the energy coupled into an orthogonal mode of the resonator mass.

26 Claims, 5 Drawing Sheets

(51) Int. Cl.
  *G01C 19/5684* (2012.01)
  *G01P 15/097* (2006.01)
  *G01P 15/125* (2006.01)
  *G01P 15/18* (2013.01)

(58) Field of Classification Search
  USPC .................. 73/504.12, 504.14, 514.32
  See application file for complete search history.

(56) References Cited

U.S. PATENT DOCUMENTS

| | | | |
|---|---|---|---|
| 4,809,589 A | 3/1989 | Bertrand | 92/98 R |
| 5,177,579 A | 1/1993 | Jerman | 73/724 |
| 5,226,321 A * | 7/1993 | Varnham | G01C 19/5684 73/504.13 |
| 5,383,362 A * | 1/1995 | Putty | G01C 19/5691 73/504.01 |
| 5,450,751 A | 9/1995 | Putty et al. | 73/504.18 |
| 5,589,082 A | 12/1996 | Lin et al. | 216/2 |
| 5,616,864 A | 4/1997 | Johnson et al. | 73/504.04 |
| 5,652,374 A * | 7/1997 | Chia | G01P 21/00 73/1.38 |
| 5,750,899 A | 5/1998 | Hegner et al. | 73/756 |
| 5,767,405 A | 6/1998 | Bernstein et al. | 73/504.16 |
| 5,783,749 A | 7/1998 | Lee et al. | 73/504.12 |
| 5,915,276 A * | 6/1999 | Fell | G01C 19/5677 73/504.02 |
| 5,937,275 A | 8/1999 | Munzel et al. | 438/50 |
| 5,992,233 A | 11/1999 | Clark | 73/514.35 |
| 6,105,427 A | 8/2000 | Stewart et al. | 73/514.32 |
| 6,128,954 A * | 10/2000 | Jiang | G01C 19/5684 73/504.12 |
| 6,151,964 A * | 11/2000 | Nakajima | G01C 19/5684 73/504.13 |
| 6,158,280 A | 12/2000 | Nonomura et al. | 73/504.04 |
| 6,209,393 B1 | 4/2001 | Tomikawa et al. | 73/504.12 |
| 6,240,781 B1 | 6/2001 | Namerikawa | 73/504.13 |
| 6,343,509 B1 | 2/2002 | Fell et al. | 73/504.13 |
| 6,401,534 B1 | 6/2002 | Fell et al. | 73/504.13 |
| 6,438,242 B1 | 8/2002 | Howarth | 381/190 |
| 6,635,509 B1 | 10/2003 | Ouellet | 438/106 |
| 6,848,305 B2 | 2/2005 | Fell et al. | 73/504.13 |
| 6,877,374 B2 | 4/2005 | Geen | 73/504.14 |
| 6,892,575 B2 | 5/2005 | Nasiri et al. | 73/504.12 |
| 6,958,566 B2 | 10/2005 | Nguyen et al. | 310/321 |
| 6,978,674 B2 | 12/2005 | Fell et al. | 73/504.13 |
| 6,985,051 B2 | 1/2006 | Nguyen et al. | 333/186 |
| 7,032,451 B2 | 4/2006 | Geen | 73/504.14 |
| 7,043,985 B2 | 5/2006 | Ayazi et al. | 73/504.04 |
| 7,051,590 B1 | 5/2006 | Lemkin et al. | 73/504.04 |
| 7,089,792 B2 | 8/2006 | Geen | 73/504.12 |
| 7,123,111 B2 | 10/2006 | Brunson et al. | 331/116 M |
| 7,178,378 B2 | 2/2007 | Crawley et al. | 73/24.06 |
| 7,204,144 B2 | 4/2007 | Geen | 73/504.14 |
| 7,216,539 B2 | 5/2007 | Geen | 73/504.14 |
| 7,216,541 B2 | 5/2007 | Kato et al. | 73/514.32 |
| 7,357,025 B2 | 4/2008 | Geen | 73/504.12 |
| 7,420,318 B1 | 9/2008 | Pulskamp | 310/328 |
| 7,427,819 B2 | 9/2008 | Hoen et al. | 310/320 |
| 7,444,870 B2 | 11/2008 | Uchiyama et al. | 73/504.12 |
| 7,492,241 B2 | 2/2009 | Piazza et al. | 333/189 |
| 7,543,496 B2 | 6/2009 | Ayazi et al. | 73/504.12 |
| 7,551,043 B2 | 6/2009 | Nguyen et al. | 333/186 |
| 7,578,186 B2 | 8/2009 | Matsuhisa | 73/504.12 |
| 7,581,443 B2 | 9/2009 | Kubena et al. | 73/504.12 |
| 7,617,727 B2 * | 11/2009 | Watson | G01C 19/5691 73/504.13 |
| 7,637,156 B2 | 12/2009 | Araki et al. | 73/504.13 |
| 7,874,209 B2 | 1/2011 | Stewart | 73/504.01 |
| 7,878,060 B2 | 2/2011 | Yoshikawa | 73/504.04 |
| 7,895,892 B2 | 3/2011 | Aigner | 73/504.01 |
| 7,950,281 B2 | 5/2011 | Hammerschmidt | 73/504.04 |
| 8,056,413 B2 | 11/2011 | Yazdi | 73/504.13 |
| 8,146,425 B2 | 4/2012 | Zhang et al. | 73/514.32 |
| 8,166,816 B2 | 5/2012 | Ayazi et al. | 73/504.12 |
| 8,250,919 B2 | 8/2012 | Ofri et al. | 73/504.13 |
| 8,372,677 B2 | 2/2013 | Mehregany | 438/51 |
| 8,408,060 B2 | 4/2013 | Kuang et al. | 73/504.13 |
| 8,464,585 B2 | 6/2013 | Raman et al. | 73/504.12 |
| 8,616,056 B2 | 12/2013 | Sammoura et al. | 73/504.13 |
| 8,631,700 B2 | 1/2014 | Sammoura et al. | 73/504.12 |
| 9,091,544 B2 | 7/2015 | Johari-Galle | 73/504.13 |
| 2002/0029637 A1 | 3/2002 | Matsumoto et al. | 73/504.01 |
| 2003/0051550 A1 | 3/2003 | Nguyen et al. | 73/514.36 |
| 2003/0119220 A1 | 6/2003 | Mlcak et al. | 438/52 |
| 2003/0183888 A1 | 10/2003 | Bar-Sadeh et al. | 257/419 |
| 2004/0050160 A1 | 3/2004 | Bae et al. | 73/504.13 |
| 2004/0051595 A1 | 3/2004 | Yoshimine et al. | 331/158 |
| 2004/0085000 A1 | 5/2004 | Ogiura | 310/329 |
| 2004/0134279 A1 | 7/2004 | Fell et al. | 73/504.13 |
| 2005/0072230 A1 | 4/2005 | Koike et al. | 73/504.12 |
| 2005/0148065 A1 | 7/2005 | Zhang et al. | 435/287.2 |
| 2006/0133953 A1 | 6/2006 | Zhang et al. | 422/58 |
| 2006/0196253 A1 | 9/2006 | Crawley et al. | 73/53.01 |
| 2006/0197411 A1 | 9/2006 | Hoen et al. | 310/320 |
| 2006/0237806 A1 | 10/2006 | Martin et al. | 257/415 |
| 2006/0238078 A1 | 10/2006 | Liu | 310/338 |
| 2007/0046398 A1 | 3/2007 | Nguyen et al. | 333/186 |
| 2007/0172940 A9 | 7/2007 | Manalis et al. | 435/287.2 |
| 2007/0220971 A1 | 9/2007 | Ayazi et al. | 73/504.02 |
| 2007/0256495 A1 | 11/2007 | Watson | 73/504.12 |
| 2007/0284971 A1 | 12/2007 | Sano et al. | 310/364 |
| 2008/0054759 A1 | 3/2008 | Ayazi et al. | 310/309 |
| 2008/0168838 A1 | 7/2008 | Martin et al. | 73/514.32 |
| 2008/0180890 A1 | 7/2008 | Bolis | 361/679 |
| 2008/0190181 A1 | 8/2008 | Khuri-Yakub et al. | 73/64.53 |
| 2008/0282833 A1 | 11/2008 | Chaumet | 74/5 R |
| 2009/0064782 A1 * | 3/2009 | Yazdi | G01C 19/5684 73/504.13 |
| 2009/0095079 A1 | 4/2009 | Ayazi | 73/514.29 |
| 2009/0114016 A1 | 5/2009 | Nasiri et al. | 73/504.12 |
| 2009/0133498 A1 | 5/2009 | Lo et al. | 73/504.13 |
| 2009/0173157 A1 | 7/2009 | Stewart | 73/504.13 |
| 2009/0173158 A1 | 7/2009 | Gehring | 73/590 |
| 2009/0188317 A1 | 7/2009 | Aigner | 73/504.01 |
| 2009/0241662 A1 | 10/2009 | Supino et al. | 73/504.12 |
| 2009/0266162 A1 | 10/2009 | Ayazi et al. | 73/504.12 |
| 2009/0277271 A1 | 11/2009 | Seppa et al. | 73/627 |
| 2010/0058861 A1 | 3/2010 | Kuang et al. | 73/504.12 |
| 2010/0107761 A1 * | 5/2010 | Ofri | G01C 19/5684 73/504.13 |
| 2010/0148341 A1 | 6/2010 | Fuji et al. | 257/686 |
| 2010/0218606 A1 | 9/2010 | Fell | 73/504.13 |
| 2010/0263445 A1 | 10/2010 | Hayner et al. | 73/504.12 |
| 2010/0294039 A1 | 11/2010 | Geen | 73/504.12 |
| 2011/0023601 A1 | 2/2011 | Ikeda et al. | 73/504.13 |
| 2011/0048131 A1 | 3/2011 | Reinmuth | 73/504.12 |
| 2011/0192226 A1 | 8/2011 | Hayner et al. | 73/504.12 |
| 2011/0254599 A1 | 10/2011 | Dikshit et al. | 327/156 |
| 2012/0013774 A1 | 1/2012 | Kim et al. | 348/246 |
| 2012/0111112 A1 | 5/2012 | Sammoura et al. | 73/514.01 |
| 2012/0111113 A1 | 5/2012 | Sammoura et al. | 73/514.01 |
| 2012/0112765 A1 | 5/2012 | Sparks et al. | 324/633 |
| 2012/0137773 A1 | 6/2012 | Judy et al. | 73/504.12 |
| 2012/0137774 A1 | 6/2012 | Judy et al. | 73/504.12 |
| 2012/0195797 A1 | 8/2012 | Sparks et al. | 422/69 |
| 2012/0227487 A1 | 9/2012 | Ayazi et al. | 73/504.08 |
| 2013/0199294 A1 * | 8/2013 | Townsend | G01C 19/5677 73/504.13 |
| 2013/0319116 A1 * | 12/2013 | Johari-Galle | G01C 19/5684 73/504.13 |
| 2015/0128701 A1 * | 5/2015 | Vohra | G01C 19/5684 73/504.12 |
| 2016/0123735 A1 | 5/2016 | Gregory et al. | G01C 19/5677 |

FOREIGN PATENT DOCUMENTS

| | | | |
|---|---|---|---|
| EP | 2 078 925 | 7/2009 | G01C 19/56 |
| EP | 2216904 | 8/2010 | H03H 9/25 |
| JP | 9116250 | 5/1997 | H05K 1/18 |
| JP | 2004 301734 | 10/2004 | G01C 19/56 |
| JP | 2008-64742 | 3/2008 | G01P 21/00 |

(56) References Cited

FOREIGN PATENT DOCUMENTS

| JP | 2009-531707 | 9/2009 | ............ G01C 19/56 |
|---|---|---|---|
| WO | WO 2007/061610 | 5/2007 | ............ H01L 41/08 |
| WO | WO 2009/066640 | 5/2009 | ............ H03H 9/25 |

OTHER PUBLICATIONS

Senkal et al., "100K Q-Factor Toroidal Ring Gyroscope Implemented in Wafer-Level Epitaxial Silicon Encapsulation Process," *2014 IEEE 27th International Conference on Micro Electro Mechanical Systems (MEMS)*, pp. 24-27 (2014).

Sonmezoglu et al., "Simultaneous Detection of Linear and Coriolis Accelerations on a Mode-Matched MEMS Gyroscope," *2014 IEEE 27th International Conference on Micro Electro Mechanical Systems (MEMS)*, pp. 32-35 (2014).

Ayazi, "Intergrated Solutions for Motion Sensing in Handheld Devices," Qualtré Inc., http://www.qualtre.com/motion-sensing-technology/ , Oct. 2010, 3 pages.

Ayazi et al., "High Aspect-Ratio Combined Poly and Single-Crystal Silicon (HARPSS) MEMS Technology;" Journal of Microelectromechanical Systems, vol. 9, No. 3, Sep. 2000, 7 pages.

Ayazi et al., "Design and Fabrication of a High-Performance Polysilicon Vibrating Ring Gyroscope;" Center for Integrated Sensors and Circuits; Eleventh IEEE/ASME International Workshop on Micro Electro Mechanical Systems, Heidelberg, Germany, Jan. 25-29, 1998, 6 pages.

Ayazi et al., "A HARPSS Polysilicon Vibrating Ring Gyroscope;" Journal of Microelectromechanical Systems, vol. 10, No. 2, Jun. 2001, 11 pages.

Benes et al., "Comparison Between BAW and SAW Sensor Principles," *IEEE Transactions on Ultrasonics, Ferroelectrics and Frequency Control*, vol. 45 No. 5, Sep. 1998, pp. 1314-1330.

Bernstein, "An Overview of MEMS Inertial Sensing Technology," Sensors, http://www.sensorsmag.com/sensors/acceleration-vibration/an-overview-mems-inertial-sensing-technology-970 , Feb. 1, 2003, 6 pages.

Celikel et al., "Optoelectronic Design Parameters of Interferometric Fiber Optic Gyroscope with LiNbO3 Having North Finder Capability and Earth Rotation Rate Measurement," *Indian Journal of Pure & Applied Physics*, vol. 48, pp. 375-384, Jun. 2010, 10 pages.

Doe, "Qualtré Targets 3-Axis Gyro Market with Alternative Technology," *MEMS Trends*, Issue No. 3, pp. 8, Jul. 2010, 1 page.

Drafts, "Acoustic Wave Technology Sensors," Sensors (www.sensorsmag.com), 5 pages, Oct. 1, 2000.

Dubois, "Thin film bulk acoustic wave resonators: a technology overview," MEMSWAVE 03, Toulouse, France, 4 pages, Jul. 2-4, 2003.

Geen et al., New iMEMS® Angular-Rate-Sensing Gyroscope; ADI Micromachined Products Division; Analog Dialogue 37-3 (2003), 4 pages.

Johari, "Micromachined Capacitive Silicon Bulk Acoustic Wave Gyroscopes," A Dissertation Presented to the Academic Faculty in Partial Fulfillment of the Requirements for the Degree Doctor of Philosophy in the School of Mechanical Engineering Georgia Institute of Technology, Dec. 2008, 28 pages.

Johari et al., "High-Frequency Capacitive Disk Gyroscope in (100) and (111) Silicon," School of Electrical and Computer Engineering, Georgia Institute of Technology, MEMS 2007, pp. 47-50, Jan. 2007, 4 pages.

Johari et al., "Capacitive Bulk Wave Silicon Disk Gyroscopes," Electron Devices Meeting, 2006, Dec. 1, 2006, 4 pages.

Johnson, "Mechanical filters in electronics", John Wiley and Sons, 1983. ISBN: 0-471-08919-2 Chapter 3: Resonators and Coupling Elements, p. 83-97.

Johnson, "Qualtre Preps Solid State MEMS Gyros," *MEMS Investor Journal*, http://www.memsinvestorjournal.com/2010/04/qualtre-preps-solidstate-mems -gyros.html_, Apr. 8, 2010, 2 pages.

Link, "Angular Rate Detector DAVED®-RR," Application Report SE 090.2; Institute of Micromachining and Information Technology, 1 page, Dec. 11, 2007, http://hsgimit.de/fileadmin/gfx/pdfs/AnwendungsberichtSE090 _2rr_englisch_V1.pdf.

Link, "Angular Rate Detector DAVED®-LL," Application Report SE 100.1; Institute of Micromachining and Information Technology, 1 page, Dec. 11, 2007,hsg-imit.de/fileadmin/gfx/pdfs/anwendungsberichtse100_111_englisch01.pdf.

Nasiri, "A Critical Review of MEMS Gyroscopes Technology and Commercialization Status," InvenSense, 8 pages, 2005, www.scantec.de/uploads/mdia/MEMSGyroComp_02.pdf.

Ramirez, "PZE Energy Harvester," *45 RF MEMS Based Circuit Design*—conocimeintos.com.ve, http://conocimientosrfmemsdesign.blogspot.com/2010/07/pze-energy-harvester.html , Jul. 24, 2010, 4 pages.

Satrom et al., "Disc Resonating Gyroscopes: A Summary of a Recent Development in MEMS Technology," Northwestern University, http://www.google.com/url?sa=t&rct=j&q=&esrc=sfrm=1&source=web&cd=1&sqi=2&ved=0CCQQFjAA&url=http%3A%2F%2Fclifton.mech.northwestern.edu%2F~me381%2Fproject%2F06fall%2FFruthSatrom.pdf&ei=ZOsyT6D3IMjMrQfE6qSnDA&usg=AFQjCNFXOj00sAsF6bMdfEV70D7JzzLkBw&sig2=jwpU1Tgot45sT_fgi81zMw, Dec. 1, 2006, 15 pages.

Saukoski, "System and Circuit Design for a Capacitive MEMS Gyroscope," Doctoral Dissertation, TKK Dissertations 116, Helsinki University of Technology, 279 pages (2008).

Yang et al., "An electro-thermal bimorph-based microactuator for precise track-positioning of optical disk drives;" J. Micromech. Microeng., v. 15 (2005) 958-965 Journal of Micromechanics and Microengineering.

Piezoelectric Transducers and Inertial Sensors using Piezoelectric Transducers, John A. Geen William A. Clark Jinbo Kuang, U.S. Appl. No. 12/208,803, filed Sep. 11, 2008.

MEMS In-Plane Resonators, Milind Bhagavat Andrew W. Sparks, U.S. Appl. No. 12/853,619, filed Aug. 10, 2010.

Resonating Sensor with Mechanical Constraints, William D. Sawyer Firas N. Sammoura, U.S. Appl. No. 12/940,354, filed Nov. 5, 2010.

MEMS Sensors with Closed Nodal Anchors for Operation in an In-Plane Contour Mode, William D. Sawyer Andrew W. Sparks, U.S. Appl. No. 13/017,247, filed Jan. 31, 2011.

BAW Gyroscope with Bottom Electrode, Kuang (Ken) L. Yang Firas N. Sammoura, U.S. Appl. No. 12/983,476, filed Jan. 3, 2011.

Apparatus and Method for Anchoring Electrodes in MEMS Devices, Houri Johari-Galle Michael W. Judy John A. Geen, U.S. Appl. No. 13/308,687, filed Dec. 1, 2011.

Non-Degenerate Mode MEMS Gyroscope, Houri Johari-Galle John A. Geen Michael A. Judy, U.S. Appl. No. 13/309,511, filed Dec. 1, 2011.

\* cited by examiner

DUAL USE OF A RING STRUCTURE AS GYROSCOPE AND ACCELEROMETER

The present application is a continuation-in-part of copending U.S. patent application Ser. No. 14/080,370 (Vohra et al.), filed Nov. 14, 2013, and incorporated herein by reference.

TECHNICAL FIELD

Various embodiments of the present invention generally relate to inertial sensors and, more particularly, various embodiments of the invention relate to ring sensors that detect both linear and rotational motion.

BACKGROUND ART

Sensing rotation and linear acceleration, in such applications as automotive control systems, etc., has typically required the pairing of distinct gyroscopes and accelerometers. Both bulk and ring resonators, suitably designed and configured, may serve as inertial sensors of rotation and of translational acceleration. For example, a bulk acoustic wave (BAW) gyroscope may be driven to resonate in one or more bulk modes by a set of drive electrodes such that a change in the bulk mode shape may be sensed to derive rotation of the sensor. Recent work has shown that the self-same resonator mass that constitutes a gyroscope, as just described, may also be excited to move in a translational mode and may serve as an accelerometer, sensing acceleration along one-, two- or three-orthogonal axes. The resonator mass may thus be excited to operate in either a gyroscope mode, a linear sensing mode, or in a combined mode, wherein distinct modes are excited simultaneously by distinct drive electrodes and detected by distinct sensing electrodes.

Sonmezoglu et al., "Simultaneous detection of linear and Coriolis accelerations on a mode-matched MEMS gyroscope," *IEEE Int. Conf. on MEMS*, pp. 32-35, (26-30 Jan. 2014), incorporated herein by reference, describe a signal processing modality applied to a tuning-fork gyroscope in which residual quadrature signals on differential sense-mode electrodes are used to measure linear acceleration action on the sense axis of the gyroscope. The effect of linear acceleration along that gyroscope axis can then be compensated to suppress its effect on gyroscope output.

It would be desirable, however, for there to be a method or apparatus whereby linear acceleration within a plane might be sensed without the need for a distinct excitation signal for sensing the mode of the resonator, thereby reducing size, power requirements and cost of a sensor that provides both gyroscopic and linear acceleration data.

SUMMARY OF EMBODIMENTS OF THE INVENTION

In accordance with an embodiment of the present invention, a method is provided for detecting linear acceleration. The method has steps of:
providing a resonator mass;
driving the resonator mass at a resonance frequency of a first mode, the first mode characterized by a first mode amplitude;
sensing the first mode amplitude by means of a set of at least two drive-sense electrodes, each of the at least two drive-sense electrodes generating a signal; and
deriving a linear acceleration based at least on a difference between signals of the at least two drive-sense electrodes.

In accordance with other embodiments of the invention, the set of drive-sense electrodes may include an opposing pair of drive-sense electrodes, or two orthogonal opposing pairs of drive-sense electrodes. Driving the resonator mass may be performed by a set of drive electrodes that includes an opposing pair of drive electrodes.

In accordance with further embodiments of the present invention, the step of deriving a linear acceleration may include differencing a first signal generated by a first drive-sense electrode and a second signal generated by a second drive-sense electrode.

In alternate embodiments, there may be additional steps of sensing a second mode amplitude by means of a set of rate-sense electrodes and deriving a rate of rotation based at least on the second mode amplitude.

In accordance with yet further embodiments of the present invention, the step of deriving a rate of rotation and the step of deriving a linear acceleration may be performed by a single read-out circuit. The resonator mass may be a disk, or a ring structure. Driving the resonator mass at a resonance frequency of a first mode may include closed-loop locking based on amplitudes of signals sensed by the set of at least two drive-sense electrodes, and, more particularly, based on a difference between signals acquired by orthogonal opposing pairs of drive-sense electrodes. Closed-loop locking may include phase-locking.

In further embodiments still, the step of deriving a linear acceleration may include differencing opposing drive-sense electrodes belonging to respective orthogonal opposing pairs of electrodes. Deriving a linear acceleration may include deriving a linear acceleration vector in a plane or in three dimensions.

In accordance with another aspect of the present invention, a resonator is provided that has a substrate supporting a ring characterized by a resonant frequency and at least one actuator configured to drive the ring. The resonator also has a plurality of drive-sense electrodes disposed in opposing pairs about the ring, and the drive-sense electrodes are adapted to generate drive-sense signals. An input is operably coupled to the plurality of drive-sense electrodes and configured to receive and to difference the drive-sense signals, while a linear acceleration processor is operably coupled to the input for receiving a drive-sense signal difference and for deriving therefrom a linear acceleration value.

In further embodiments of the invention, the resonator may also have a set of rate-sense electrodes disposed about the ring, each adapted to generate a rate-sense signal, and a rotation rate processor operably coupled to the set of rate-sense electrodes and adapted to receive each rate-sense signal and to derive therefrom a rotation rate value. The linear acceleration processor and the rotation rate processor may, in some embodiments, be a singular processor.

In other embodiments, the set of drive-sense electrodes may include opposing pairs of drive-sense electrodes, and the set of rate-sense electrodes includes opposing pairs of rate-sense electrodes.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions

The term "set," as used herein, shall not include the empty set, and shall refer to any counting number $\{\subset\mathbb{C}\}$ of specified elements, including one.

The term "plurality," as used herein, shall mean "two or more."

A "difference" between two signals shall refer to a linear combination of the amplitudes of two signals whereby the combination includes components of the respective signal amplitudes which are out of phase with each other. Thus, for example, the signals may undergo common, or differential, amplification or attenuation, prior to combination out of phase. Similarly, the verb "difference" shall refer to generating a difference between two signals as previously defined.

An "electrode" shall refer to any transducer which provides a signal that is related in a known way to a sensed quantity. Thus, an electrode may sense electrostatically, or capacitively, or magnetically, for example, or using any sensing modality, to generate a signal.

The term "opposing," as referring to electrodes disposed with respect to a resonator mass having cylindrical symmetry, shall denote that the electrodes are disposed substantially along a line that is perpendicular to the axis of cylindrical symmetry of the resonator mass.

"Orthogonal pairs" of electrodes, as referring to electrodes disposed with respect to a resonator mass having cylindrical symmetry, shall denote pairs of electrodes disposed along substantially perpendicular directions, which is to say, along orthogonal linear acceleration axes, in a plane transverse to the axis of cylindrical symmetry of the resonator mass.

The term "about," used in the sense of electrodes disposed about a ring, shall refer, without limitation, to placement on opposite sides of a plane containing the axis of cylindrical symmetry of the ring. The term is not specific as to the placement of electrodes inside, outside, above, or below, the ring.

A "ring resonator" shall refer to a structure of cylindrical symmetry, of which a resonant frequency pertinent to the sensing application described herein is predominantly governed by the stiffness of the ring rather than by the stiffness of the support of the ring relative to a supporting structure.

One modality wherein both gyroscope and linear modes are separately excited and detected is described in copending U.S. patent application Ser. No. 14/080,370 ("Vohra '370"), filed Nov. 14, 2013, and incorporated herein by reference in its entirety. In the Vohra '370 application, separate clocks are employed to sense one or more translational mode signals from those used to drive the gyroscope.

Figure 1:
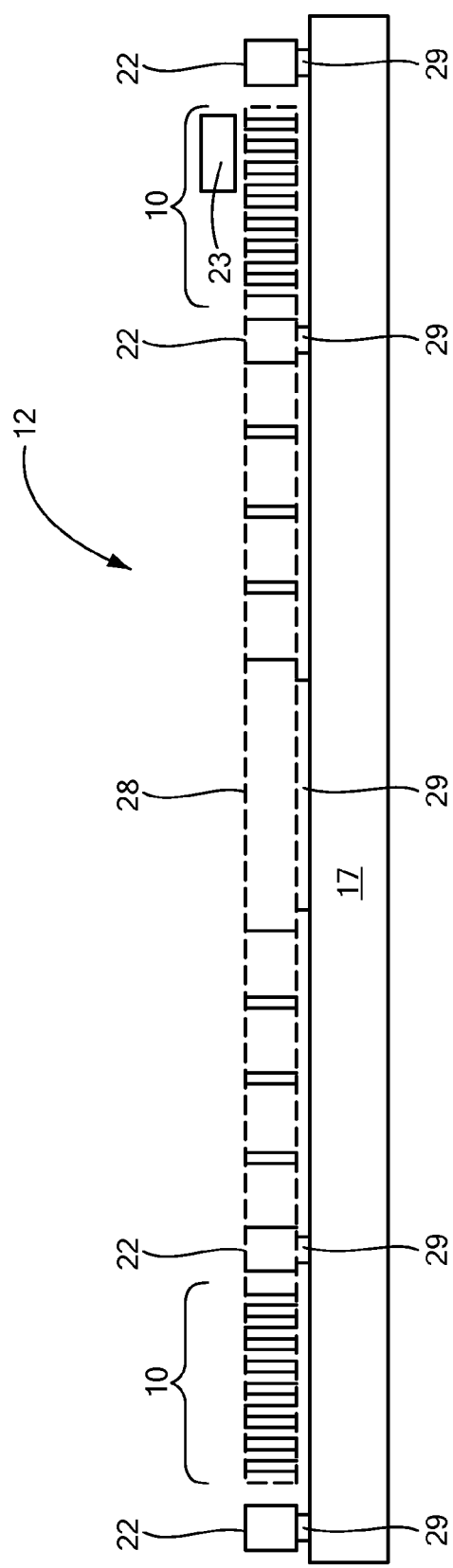
FIG. 1 schematically depicts a cross-sectional view of a MEMS ring resonator that may be configured to detect both rotation and linear acceleration in accordance with embodiments of the present invention.

FIG. 1 is provided to show salient parts of a MEMS resonator, designated generally by numeral 12, which is a ring resonator in the depicted embodiment. Teachings in accordance with the present invention may be applied to various geometries of a MEMS resonator, and a ring resonator is depicted by way of example only.

The present description may use orientational terms such as "top," "bottom," and the like, for descriptive convenience only, though it is to be understood that the orientation in space of the presently described apparatus is of no relevance to the invention as claimed. Those terms are used with respect to the frame of reference of FIG. 1.

Resonator 12 is a one, two, or three dimensional inertial sensor that measures rotational movement about the X, Y or Z axes, where the X axis is into the page in FIG. 1, the Y axis is horizontal, and the Z axis is vertical. Resonator 12, in accordance with the present invention, may also measure linear motion with respect to one or more of the three orthogonal axes of linear motion. Accordingly, those skilled in the art refer to this type of resonator as either or all of a Z gyroscope, an X/Y gyroscope, a two or three dimensional gyroscope, a one, two, or three axis accelerometer, and/or a combination accelerometer and gyroscope. It nevertheless should be reiterated that illustrative embodiments apply to inertial sensors that measure rotation about a subset of orthogonal linear axes, such as the Z-axis alone, about the X-axis and Z-axis, or about all three axes, among the various combinations. Accordingly, discussion of the specific resonator 12 depicted in FIG. 1 is not to limit various embodiments of the invention.

As noted above, the resonator 12 can act as a gyroscope and/or as an accelerometer. The gyroscopic function is discussed first, immediately below. At its core, MEMS resonator 12 has a sensor mass 10, which, in the embodiment of FIG. 1, assumes the shape of a composite ring comprised of a plurality of substantially concentric subrings 15. Sensor mass 10 may henceforth be referred to herein as a ring 10, without loss of generality. Ring 10 can resonate in one of the known types of vibrational modes upon receipt of an appropriate electrostatic actuation signal. The vibrational mode for detecting rotational movement in the embodiment shown is typically an elliptical mode, however it can be any of a variety of different modes, either in-plane or out-of-plane, within the scope of the present invention.

One or more electrodes 22 (discussed below) produce an electrostatic force that causes portions of ring 10 to vibrate relative to a substrate 17 during both actuation and detection phases. The ring 10 is configured to vibrate in a predetermined manner at the known vibration frequency. For example, the vibration frequency may be the resonant frequency of the ring 10. Specifically, parts of the ring 10 may vibrate, while other parts of the ring 10 may remain substantially stable—so-called "nodes" of the vibration.

Rotation about the Z-axis causes coupling of some energy from a first vibrational mode of ring 10, at which the ring is driven, into a second, and orthogonal, vibrational mode of the ring, by virtue of Coriolis forces. The vibrational modes are orthogonal in the sense that they correspond to orthogonal eigenmodes of the system. By sensing the amplitude of vibration in the second mode, with one or more rate-sense electrodes, the rate of rotation may be measured.

Off-chip circuitry or on-chip circuitry 307 (shown in FIG. 3) thus detects a capacitance change (for example) as a changing signal, which includes the necessary information for identifying the degree and type of rotation. The larger system then can take appropriate action, such as controlling the rotation of tires in an automobile for stabilization control, for example.

Ring 10 should be supported to function most effectively. To that end, ring 10 is mechanically coupled via support beams 26 and 28 to at least one of anchors 29. Ring 10 may be made by depositing a polysilicon layer on substrate 17 with a sacrificial oxide layer that has been processed to form holes where anchors 29 will be formed. The polysilicon layer fills the holes to form anchors 29. The polysilicon is shaped with standard processing to form electrodes 22, support beams 26 and 28, and subrings 15 of ring 10. The sacrificial oxide layer is then removed using standard processing steps. Electrical connections to the ring and electrodes may be provided using any methods known in the art, including directly bonding to the anchored areas with bond wires, adding additional routing layers to the process, or using vias through the substrate 17 directly to attached circuitry.

In other embodiments of inertial sensors, described now with reference to FIGS. 2-5, sensor mass 10 may assume the shape of a disk, or of an annular ring 200, with axis 204 representing the axis of cylindrical symmetry for a sensor mass shaped as a disk or a ring. As used herein, the term "radial" is with respect to axis 204 of cylindrical symmetry.

A sensor mass may be characterized by its fundamental resonant frequency, which is proportional to the square root of the ratio of its stiffness to its mass. The resonant frequency of a sensor mass 10 will be different when the sensor mass is coupled to a support. In ring and disk implementations, sensor mass 10 obtains the predominant part of its stiffness from the disk itself, as opposed to its coupling to a support. It is to be understood that the teachings provided below with respect to the placement of sensors are independent of whether the sensor mass is a bulk sensor mass, a disk, or a ring, or any other geometry. In the embodiment of an inertial sensor designated generally by numeral 200 in FIG. 2, the sensor mass is a ring 201 (or, more generally, a "ring structure") supported, relative to anchor 206, by a plurality of transverse members (or "spokes") 208, typically lying substantially within the plane of ring 201, but not necessarily so.

Figure 2:
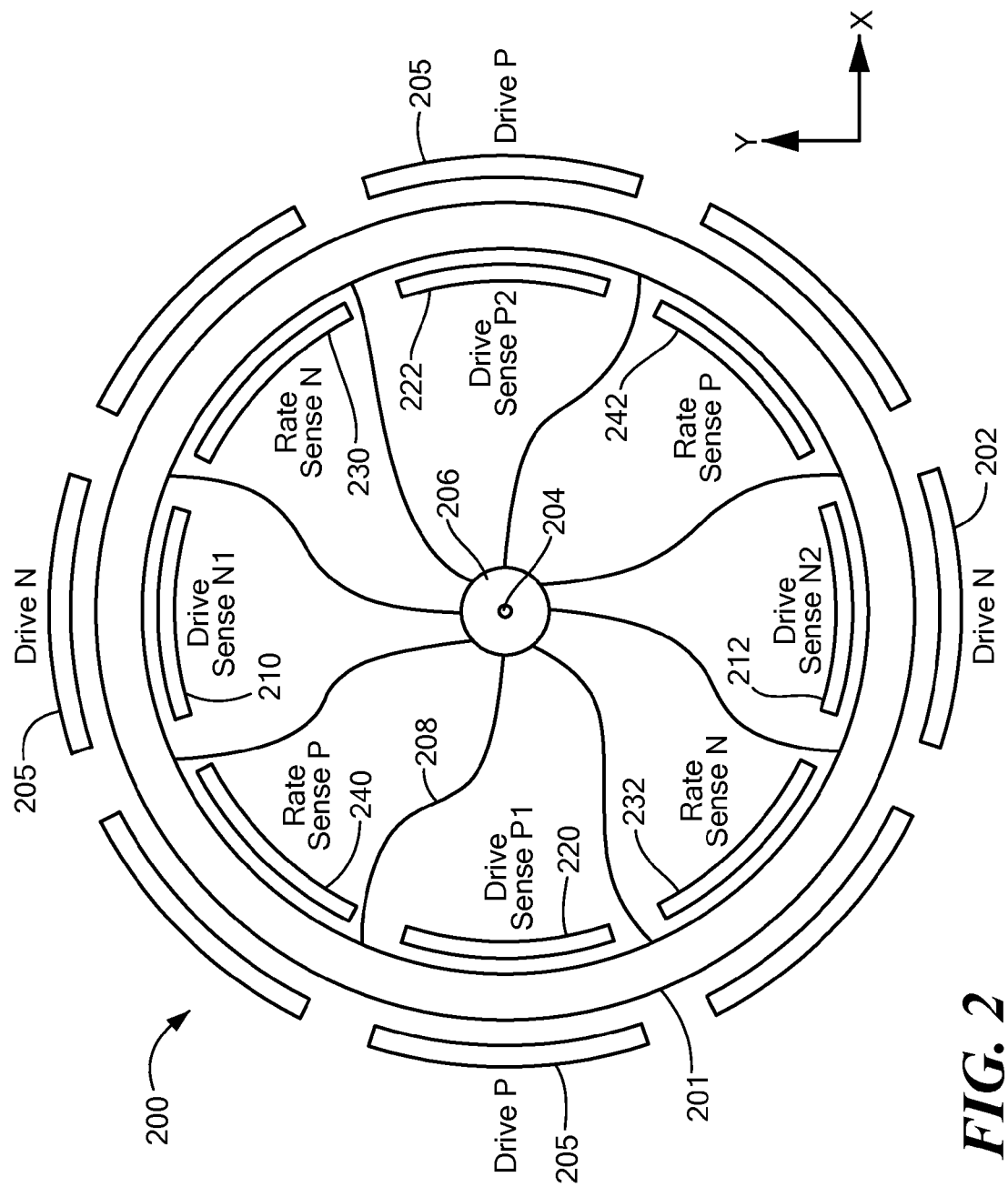
FIG. 2 shows a ring resonator with electrode placement, in accordance with an embodiment of the present invention.

Referring to FIG. 2, ring 201 is driven, at a resonant frequency or at another frequency, by means of at least one drive electrode 202, which may be referred to herein, and in any appended claims, as an "actuator." Drive electrode 202, and, similarly, other electrodes to be discussed below, are shown, for ease of depiction, in the same plane as ring 201, although it is to be understood that, within the scope of the present invention, drive electrode 202, and/or other of the electrodes to be described, may lie above or below the plane of ring 201. (To avoid ambiguity, the "plane of ring 201" shall refer to the plane of the surface of ring 201 distal to substrate 17.) Moreover, while drive electrode 202 is shown in FIG. 2 as lying outside ring 201, i.e., at a radius relative to a central axis 204 exceeding any point on ring 201, it is to be understood that such configuration is shown without limitation, and that drive electrode 202 may lie inside ring 201, or, for that matter, ring 201 may be notched, and drive electrode 202 may lie outside some regions of ring 201 and inside other regions of ring 201.

Drive electrode 202 excites ring 201 at a resonant frequency of one of the modes of vibration of ring 201. Other drive electrodes 205 may similarly drive one or more modes of vibration of ring 201. The mode of vibration excited by one drive electrode 202 may be referred to, without loss of generality, by an ordinal number, such as "first", without implying any particular ordering of the modes of vibration of ring 201, whether by frequency, wavelength, or otherwise.

In accordance with embodiments of the present invention, vibration of ring 201 is sensed by at least two drive-sense electrodes 210 and 212 (for convenience, "electrodes"), disposed substantially opposite to each other, on opposing sides of ring 201, as "opposing" is defined above. Any modality of sensor that detects vibration of ring 201 may be used as a drive-sense electrode within the scope of the present invention. Drive-sense electrodes 210 and 212 each produce electrical signals that are functionally related to the amplitude of vibration of ring 200 at positions sensed by the respective electrodes. The amplitude of the pick-off signal from each electrode depends on the gap between the electrode and the resonating structure. The function relating the sensed amplitude of vibration to the sensor signal produced is amenable to calibration. Drive 202 may be denoted Drive N, and, as a matter of notational convention, drive-sense electrode 212 that is azimuthally proximal to Drive N is denoted Drive Sense N2, while the drive-sense electrode 210 disposed on the opposing side of ring 201 is denoted Drive Sense N1. The signals produced by Drive Sense N1 and Drive Sense N2 are denoted DSN1 and DSN2, respectively. In preferred embodiments of the invention, drive 202 and drive-sense electrodes 210 and 212 lie substantially on a line through axis 204.

Drive-sense electrodes 210 and 212 are referred to herein as an "opposing pair" of electrodes. Similarly, drive-sense electrodes 220 and 222 constitute another opposing pair of drive-sense electrodes, and, insofar as a line connecting drive-sense electrodes 220 and 222 through axis 204 is substantially orthogonal to a line connecting drive-sense electrodes 210 and 212 through axis 204, the opposing pair of electrodes 210 and 212 may be said to be orthogonal to the opposing pair of electrodes 220 and 222.

Operation of inertial sensor 200 as a gyroscope, as discussed above, is based upon driving the structure's second order flexural or bulk acoustic mode to oscillate. This oscillation is sustained by picking off the amplitude of vibration from drive sense electrodes 210, 212, 220, and 222, and using that signal to create a closed-loop oscillator at the resonance frequency of the excited mode. Through the effect of Coriolis acceleration, rotation transfers energy to a second orthogonal mode, thereby causing a second oscillation that is picked off by a second set of electrodes called the rate sense electrodes, 230, 232, 240, and 242. The rate sense electrodes are preferably also arrayed in opposing pairs, of which electrodes 230 and 232 (collectively, Rate Sense N) comprise one opposing pair, while electrodes 240 and 242 (collectively, Rate Sense P) comprise an opposing pair orthogonal to the former opposing pair.

Linear acceleration of the sensor mass (in this case, ring 200) changes the gap between any one of the sensing electrodes and the sensor mass, thereby changing the amplitude of each corresponding electrode sensor signal. The rate sense and drive sense signals are combined to reject this change due to linear acceleration by adding a signal that is increased to a signal which is decreased. This is typically accomplished by adding the signals of opposing pairs of electrodes, thereby canceling out the effect of the acceleration to first order.

In accordance with the present invention, a linear accelerometer is implemented by "differencing," rather than adding, signals of respective electrodes of an opposing pair of electrodes. Differencing includes subtraction, but is more comprehensive in that it allows for any additive function of a signal and the negative of another, differenced, signal. Thus, for example, the respective signals may be scaled prior to subtraction. The resulting difference signal is a measure of linear acceleration along an axis connecting the opposing pair of electrodes, and a precise relationship between the difference signal and absolute linear acceleration in the reference frame of the inertial sensor may be obtained by calibration.

More particularly, the difference (e.g., DSP1-DSP2) between signals of one opposing pair of drive-sense electrodes 220 and 222 constitutes a measure of linear acceleration along the X axis. Similarly, the difference (e.g., DSN1-DSN2) between signals of one opposing pair of drive-sense electrodes 210 and 212 constitutes a measure of linear acceleration along the Y axis. By measuring linear acceleration along respective orthogonal axes, a rate of linear acceleration in the X-Y plane may be derived by vector addition.

Moreover, with electrodes placed above or below the plane of ring 201, and using corresponding differencing of amplitudes, acceleration along the Z axis (outside of the plane of the page in FIG. 2) may similarly be obtained, within the scope of the present invention.

The amplitude of the acceleration signal depends on the amplitude of the gyroscope mode oscillation, which is normally kept constant by an amplitude control loop or monitored to use for calibration, and the translational stiffness of the ring structure, which is a design parameter largely independent of the gyroscope modes. The accelerometer sensitivity may advantageously be designed to meet a given application by adjusting the translational stiffness and balancing it against the gyroscope acceleration rejection specification.

When used as both an accelerometer and gyroscope, rate sense electrodes 230, 232, 240, and 242 are used to sense the energy transferred to a second orthogonal mode of the sensor mass (in this case, ring 201), again adding the signals of opposing electrodes to remove the effects of linear acceleration to first order. Thus, the measured rate of rotation may be expressed as RSP1+RSP2−RSN1−RSN2. It is to be noted, in particular, that, as described herein, inertial sensor 200 may advantageously be used to derive linear acceleration data, whether employed concurrently to obtain rotational data or not, and without significantly impacting operation of the sensor as a gyroscope.

Out-of-plane electrodes 23 (shown in FIG. 1) may be employed to sense acceleration in the Z direction, employing the same stratagem as described above with respect to the X and Y axes.

Sensor operation and signal processing, as has been discussed above, for operation of inertial sensor 200 as an X-Y or X-Y-Z accelerometer and, optionally, concurrently as a gyroscope, are now further described with reference to FIG. 3. With a vibration mode excited in sensor mass (in this case ring 201) by a set of drive electrodes 205, signals 301 and 302 derived from orthogonal sets of opposing pairs of electrodes are amplified and differenced pairwise by difference amplifiers 305 and 310, or their functional equivalents. The difference signals 312 are demodulated (rectified) (325) relative to a clock signal 320 synchronous with the excitation drive in order to convert the acceleration to a baseband range, yielding X and Y axis acceleration data 330 and 332, respectively. As used herein, the term "processor" shall refer to circuitry 307 or computer processing hardware used to process electronic signals to derive useful data, as described herein.

Oscillation control algorithms that employ phase-locked loops (PLLs) to track vibrational amplitudes of a sensor mass have been described in the art, for example, by Park, *Oscillation Control Algorithms for Resonant Sensors with Applications to Vibratory Gyroscopes, Sensors*, vol. 9, pp. 5952-67 (2009), which is incorporated herein by reference. Operation of inertial sensor 200 as a linear acceleration sensor in accordance with the present invention may also be practiced using a PLL paradigm, as depicted in FIG. 4. At the same time that signals of opposing pairs of drive-sense electrodes are differenced to obtain linear acceleration data, as taught with reference to FIGS. 2-3, sums of signals of opposing pairs of drive-sense electrodes are demodulated relative to a drive signal to obtain demodulated resonator displacement data. A PLL is used to sustain the resonator amplitude by sensing phase variation and actuating anti-nodes of the resonator mode of the sensor ring, as shown.

Figure 3:
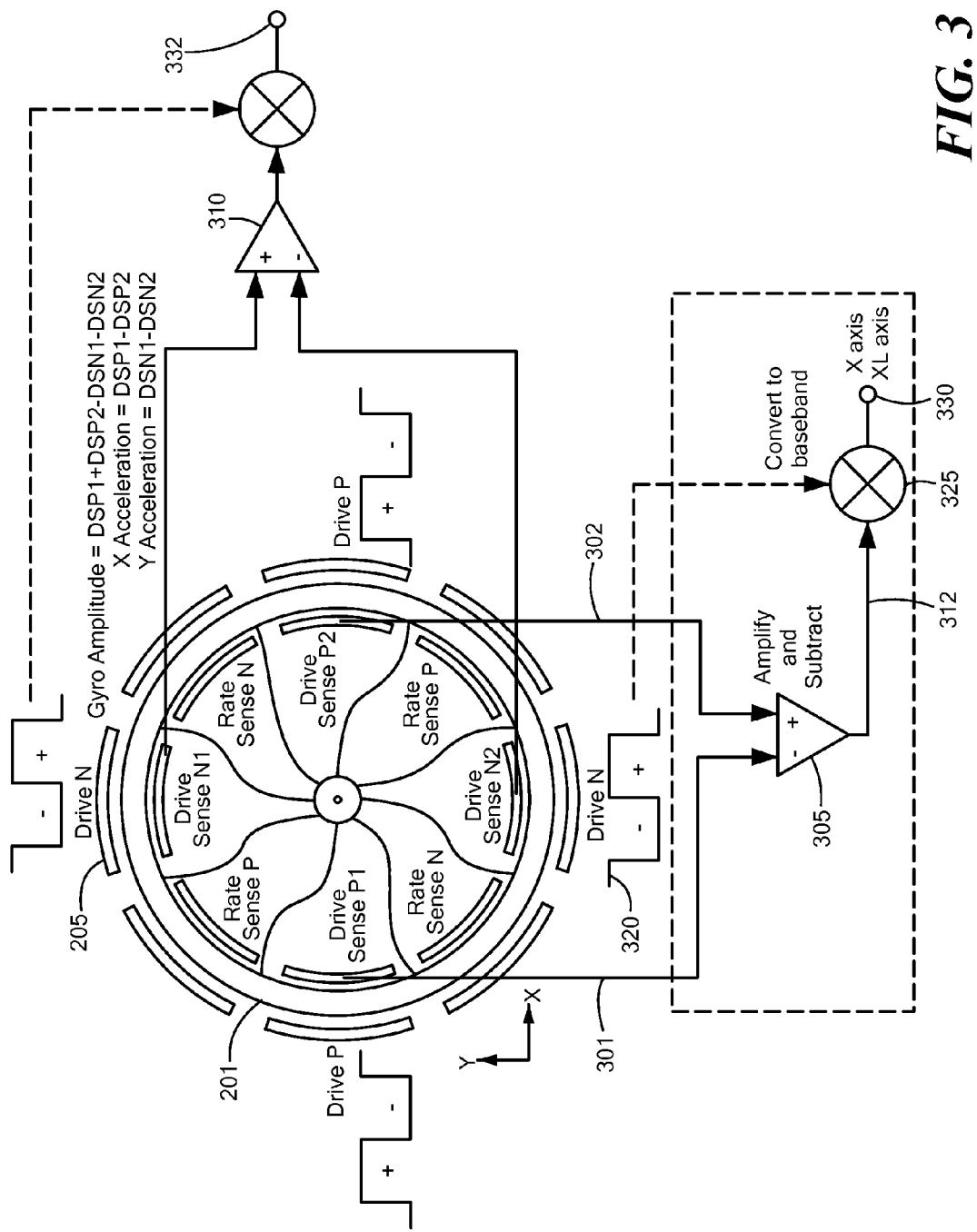
FIG. 3 shows a ring resonator configured as an X-Y accelerometer, in accordance with an embodiment of the present invention.
Figure 4:
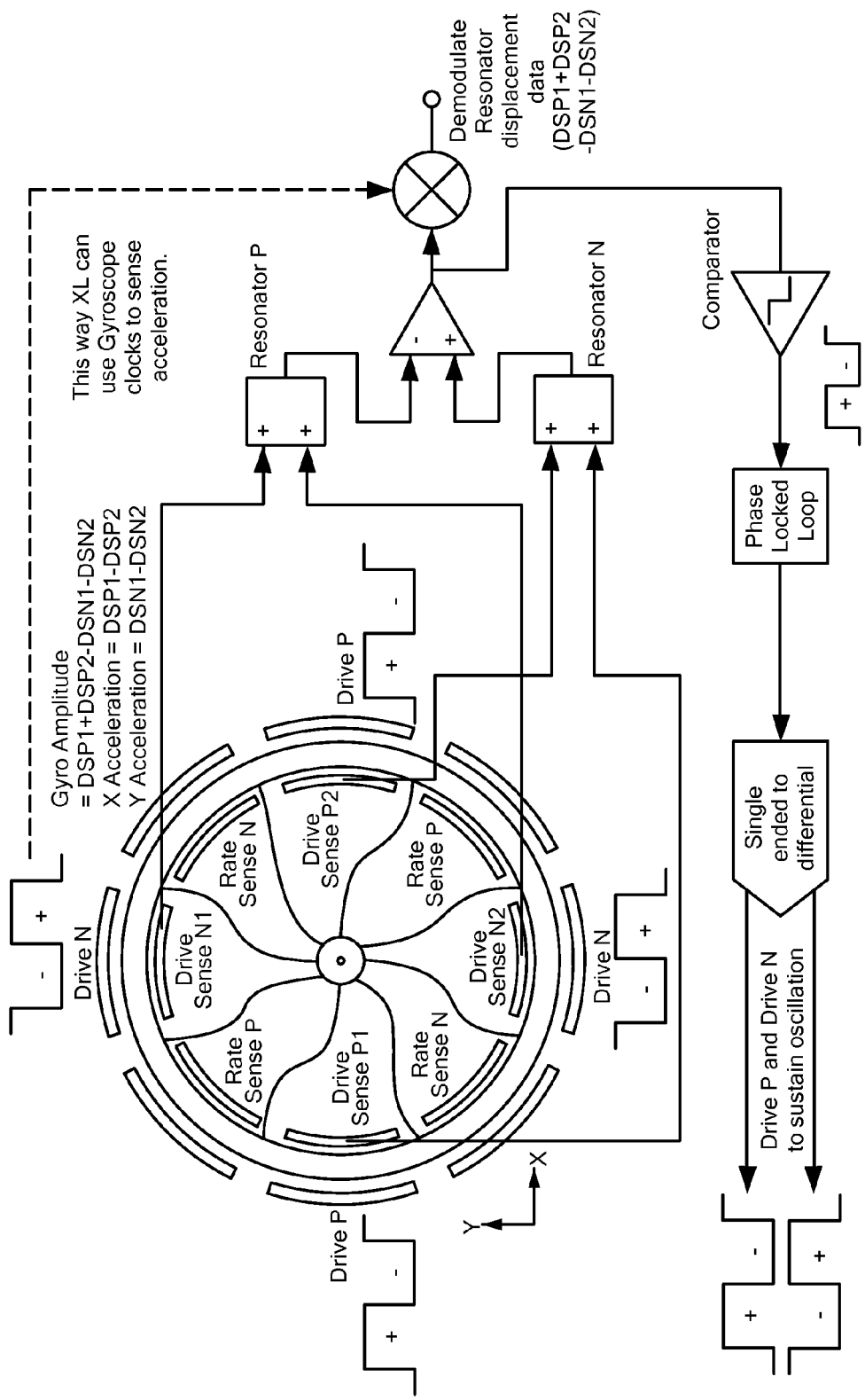
FIG. 4 schematically depicts the use of gyroscope clocks in a phase locked loop implementation to sense acceleration, in accordance with an embodiment of the present invention.
Figure 5:
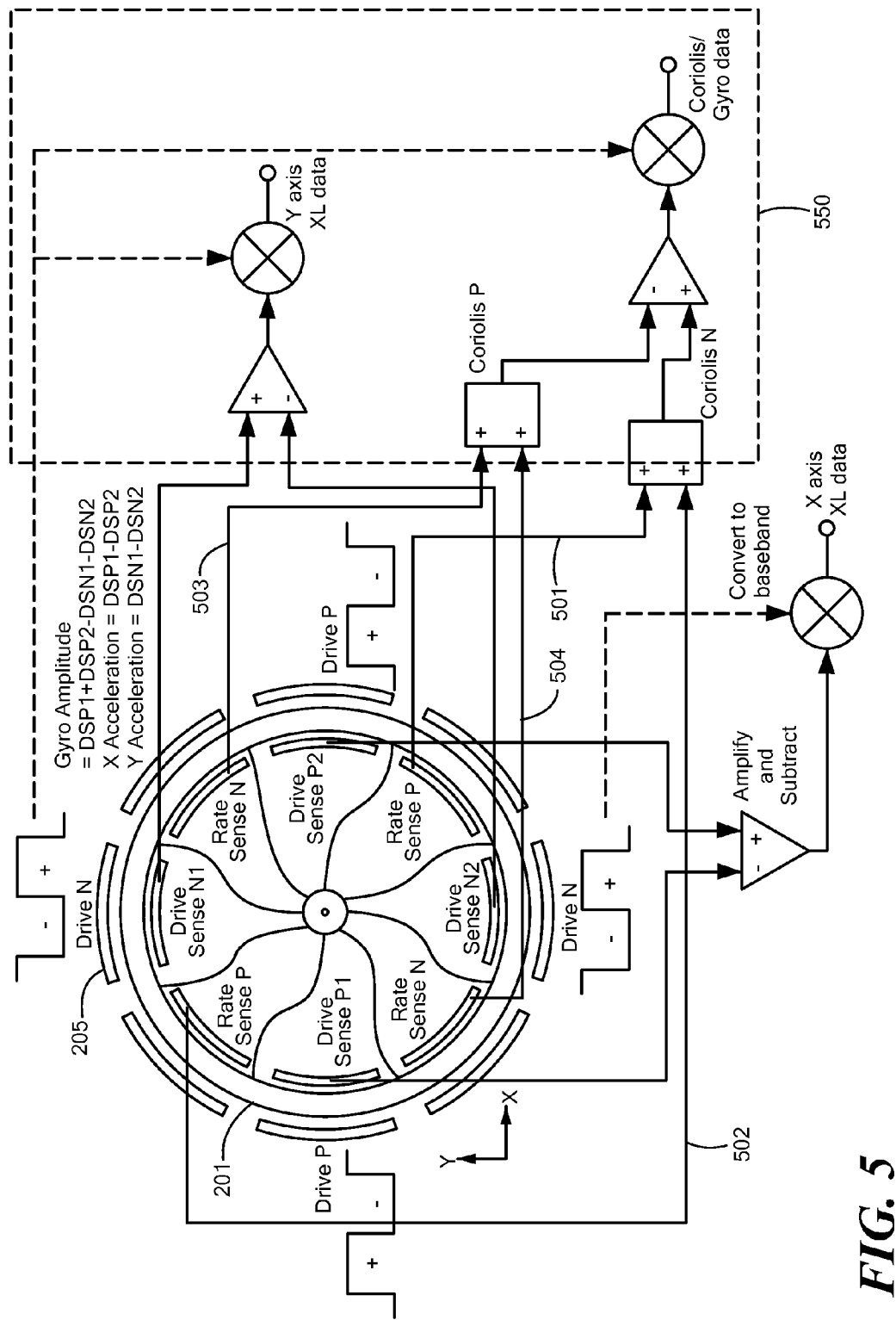
FIG. 5 schematically depicts a ring resonator configured both as a gyroscopic rate sensor and as an X-Y accelerometer, in accordance with an embodiment of the present invention.

FIG. 5 shows that while the drive sense signals (301, 302, 303, 304) are used, by differencing orthogonal opposing pairs to obtain linear acceleration data, as described in detail above with reference to FIGS. 2-4, pairs of rate sense electrode signals 501, 502, 503, 504 may be combined, concurrently, to obtain rotation rate data. No multiplexing is necessary since the rotational data, derived by summing rate sense signals, and the linear acceleration data, derived by differencing drive sense signals, may be obtained concurrently, using distinct read-out circuits, or a combined read-out circuit 550, as shown.

While exemplary embodiments of the invention are described with reference to a MEMS device that is a ring resonator, it should be noted that the present invention is general and is not limited to ring or to disk gyroscopes. Rather, embodiments of the present invention can apply more generally to other types of MEMS devices having resonating elements of other shapes.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for detecting linear acceleration, the method comprising:

driving a resonator mass at a resonance frequency of a first mode by applying differential drive signals to a first opposing pair of drive electrodes arranged along a first axis in a plane of the resonator and a second opposing pair of drive electrodes arranged along a second axis in the plane of the resonator orthogonal to the first axis, the first mode characterized by a first mode amplitude;

sensing the first mode amplitude using at least one opposing pair of drive-sense electrodes in the plane of the resonator, each of the drive-sense electrodes generating a signal; and deriving a linear acceleration based at least on a difference between signals of each opposing pair of drive-sense electrodes.

2. A method according to claim 1, wherein the at least one opposing pair of drive-sense electrodes includes two orthogonal opposing pairs of drive-sense electrodes.

3. A method according to claim 1, wherein deriving a linear acceleration includes differencing a first signal generated by a first drive-sense electrode and a second signal generated by a second drive-sense electrode of an opposing pair of drive-sense electrodes.

4. A method according to claim 1, further comprising:
sensing a second mode amplitude using a set of rate-sense electrodes; and
deriving a rate of rotation based at least on the second mode amplitude.

5. A method according to claim 4, wherein deriving a rate of rotation and deriving a linear acceleration are performed by a single read-out circuit.

6. A method according to claim 1, wherein the resonator mass is a disk.

7. A method according to claim 1, wherein the resonator mass is a ring structure.

8. A method according to claim 1, wherein driving the resonator mass at a resonance frequency of a first mode includes closed-loop locking based on amplitudes of signals sensed by the at least one opposing pair of drive-sense electrodes.

9. A method according to claim 8, wherein driving the resonator mass at a resonance frequency of a first mode includes closed-loop locking based on a difference between signals acquired by orthogonal opposing pairs of drive-sense electrodes.

10. A method according to claim 8, wherein closed-loop locking includes phase-locking.

11. A method according to claim 2, wherein deriving a linear acceleration includes differencing opposing drive-sense electrodes belonging to respective orthogonal opposing pairs of electrodes.

12. A method according to claim 1, wherein deriving a linear acceleration includes deriving a linear acceleration vector in a plane.

13. A method according to claim 1, wherein deriving a linear acceleration includes deriving a linear acceleration vector in three dimensions.

14. A sensor comprising:
a substrate supporting a resonator mass characterized by a resonant frequency;
a first opposing pair of drive electrodes arranged along a first axis in a plane of the resonator mass and a second opposing pair of drive electrodes arranged along a second axis in the plane of the resonator mass orthogonal to the first axis, the drive electrodes configured to differentially drive the resonator mass at a resonance frequency of a first mode;
at least one opposing pair of drive-sense electrodes in the plane of the resonator mass, each of the drive-sense electrodes configured to generate a drive-sense signal; and
an input operably coupled to the drive-sense electrodes, the input configured to receive the drive-sense signals and to produce a drive-sense signal difference between drive-sense signals from each opposing pair of drive-sense electrodes.

15. A sensor according to claim 14, further comprising:
a set of rate-sense electrodes disposed about the resonator mass, each rate-sense electrode adapted to generate a rate-sense signal.

16. A sensor according to claim 15, further comprising:
a linear acceleration processor operably coupled to the input and configured to receive the drive-sense signal difference and to derive therefrom a linear acceleration value; and
a rotation rate processor operably coupled to the set of rate-sense electrodes and configured to receive each rate-sense signal and to derive therefrom a rotation rate value, wherein the linear acceleration processor and the rotation rate processor are a single processor.

17. A sensor according to claim 14, wherein the at least one opposing pair of drive-sense electrodes includes two orthogonal opposing pairs of drive-sense electrodes.

18. A sensor according to claim 15, wherein the set of rate-sense electrodes includes opposing pairs of rate-sense electrodes.

19. A sensor according to claim 14, further comprising:
a linear acceleration processor operably coupled to the input and configured to receive the drive-sense signal difference and to derive therefrom a linear acceleration value.

20. A sensor according to claim 14, further comprising:
an oscillation controller configured to provide differential drive signals to the first opposing pair of drive electrodes and the second opposing pair of drive electrodes.

21. A sensor according to claim 14, wherein the resonator mass is a disk.

22. A sensor according to claim 14, wherein the resonator mass is a ring structure.

23. A sensor according to claim 14, wherein the resonator mass defines an interior region and an exterior region relative to an outer perimeter of the resonator mass, and wherein the drive electrodes are configured in the exterior region and the drive-sense electrodes are configured in the interior region.

24. A sensor according to claim 14, wherein the resonator mass defines an interior region and an exterior region relative to an outer perimeter of the resonator mass, and wherein the drive-sense electrodes are configured in the exterior region and the drive electrodes are configured in the interior region.

25. A sensor comprising:
means for differentially driving a resonator mass using two orthogonal opposing pairs of in-plane drive electrodes; and
means for differentially sensing linear acceleration using at least one opposing pair of in-plane drive-sense electrodes.

26. A sensor according to claim 25, further comprising:
means for sensing rotation using a set of rate-sense electrodes.

* * * * *